United States Patent [19]

Farnbach

[11] Patent Number: 5,299,117
[45] Date of Patent: Mar. 29, 1994

[54] POWER CONSERVING RECEIVER OPERATION FOR A REMOTE ELECTRONIC DISPLAY SYSTEM

[75] Inventor: William A. Farnbach, San Diego, Calif.

[73] Assignee: REST Manufacturing, Inc., Carlsbad, Calif.

[21] Appl. No.: 933,978

[22] Filed: Aug. 24, 1992

Related U.S. Application Data

[63] Continuation of Ser. No. 459,454, Jan. 2, 1990, abandoned.

[51] Int. Cl.⁵ .......................... G06F 15/21; H04B 1/16
[52] U.S. Cl. ..................... 364/405; 364/401; 455/343
[58] Field of Search ............... 364/401, 405; 455/343; 235/383

[56] References Cited

U.S. PATENT DOCUMENTS

| | | | |
|---|---|---|---|
| 3,769,593 | 10/1973 | Williams | 455/227 |
| 4,002,886 | 1/1977 | Sundelin | 235/383 |
| 4,139,149 | 2/1979 | Crepeau et al. | 235/383 |
| 4,531,237 | 7/1985 | Bar-on et al. | 455/343 |
| 4,713,808 | 12/1987 | Gaskill et al. | 370/93 |
| 4,766,295 | 8/1988 | Davis et al. | 235/383 |
| 4,888,709 | 12/1989 | Revesz et al. | 364/518 |
| 4,973,952 | 11/1990 | Malec et al. | 340/825.350 |
| 4,995,099 | 2/1991 | Davis | 455/343 |
| 4,996,526 | 2/1991 | DeLuca | 340/825.44 |

*Primary Examiner*—Roy N. Envall, Jr.
*Assistant Examiner*—David Huntley
*Attorney, Agent, or Firm*—Christie, Parker & Hale

[57] ABSTRACT

An information display system is provided having a transmitter and a plurality of uniquely identified display terminals, each terminal having an IR receiver. Uniquely identified sets of messages are transmitted in by the IR transceiver for reception by the display terminals. Between each set of transmissions, the receiver is periodically activated. Once the presence of a transmission is sensed by the receiver, a timer forces the receiver to remain activated while it compares the uniquely identified received messages to the display terminals unique identification. The receiver stores the message that matches the identification of the display terminal and the timer forces the receiver to remain deactivated at least until the entire set of transmissions has been completed.

1 Claim, 4 Drawing Sheets

POWER CONSERVING RECEIVER OPERATION FOR A REMOTE ELECTRONIC DISPLAY SYSTEM

CROSS-REFERENCE TO RELATED APPLICATION

This is a continuation of application Ser. No. 07/459,454, filed Jan. 2, 1990, now abandoned.

FIELD OF THE INVENTION

This invention relates generally to an electronic information display system, and, more particularly, to a computer based system for optically transmitting information to a plurality of battery powered remote display terminals.

BACKGROUND OF THE INVENTION

An exemplary electronic information display system provides an integrated pricing and advertising system for displaying up-to-date pricing information as well as advertising information on remote display terminals throughout a retail store as described and disclosed in patent application Ser. No. 07/753,004, which is a continuation of application Ser. No. 07/352,553, now abandoned. Generally, such a system has a store platform computer which provides a data base for pricing and advertising information within each store. A plurality of battery powered electronic information display terminals, which communicate with the store platform computer via an optical link, are mounted throughout the store at various merchandising locations. The optical link is implemented by an IR transceiver (or a grid of IR transceivers) which is electrically connected to the store platform computer and by an IR transceiver in each of the remote display terminals.

Two important requirements for electronic display terminals are low price and long battery life. Typically, the battery life must be four to five years. In order to make an inexpensive battery last for four to five years, the average current drain over the life of the battery must not exceed about 15 microamps. Considering that an infrared receiver may consume up to 3 mA if it continually remains activated over a five year period, measures must be taken to reduce the power consumption of the receiver.

SUMMARY OF THE INVENTION

The present invention provides a system and method for conserving power in the receiver operation of information display terminals in an integrated pricing and advertising system. The system has an IR transmitter and a plurality of uniquely addressed display terminals each having an IR receiver for receiving data from the IR transmitter. Price or advertising information messages are transmitted in transmission sets to a plurality of display terminals, each message within the set being transmitted sequentially to each of the display terminals. Data is supplied to the IR transmitter from a store platform computer which selects the display terminals to be transmitted to and controls the order in which the selected display terminals are addressed.

Each display terminal has timer and control means coupled to its IR receiver to periodically activate the IR receiver. Once the receiver senses that a transmission set is occurring, the timer forces the receiver to remain active while the receiver checks the incoming information for its display terminals unique address. The timer deactivates the IR receiver after the data message for that display terminal has been received. The receiver remains off at least until the transmitter has sent data to each of the other display terminals.

BRIEF DESCRIPTION OF THE DRAWINGS

These and other features and advantages of the present invention will be better understood by reference to the following detailed description when considered in connection with the accompanying drawings wherein.

DETAILED DESCRIPTION

Figure 1:
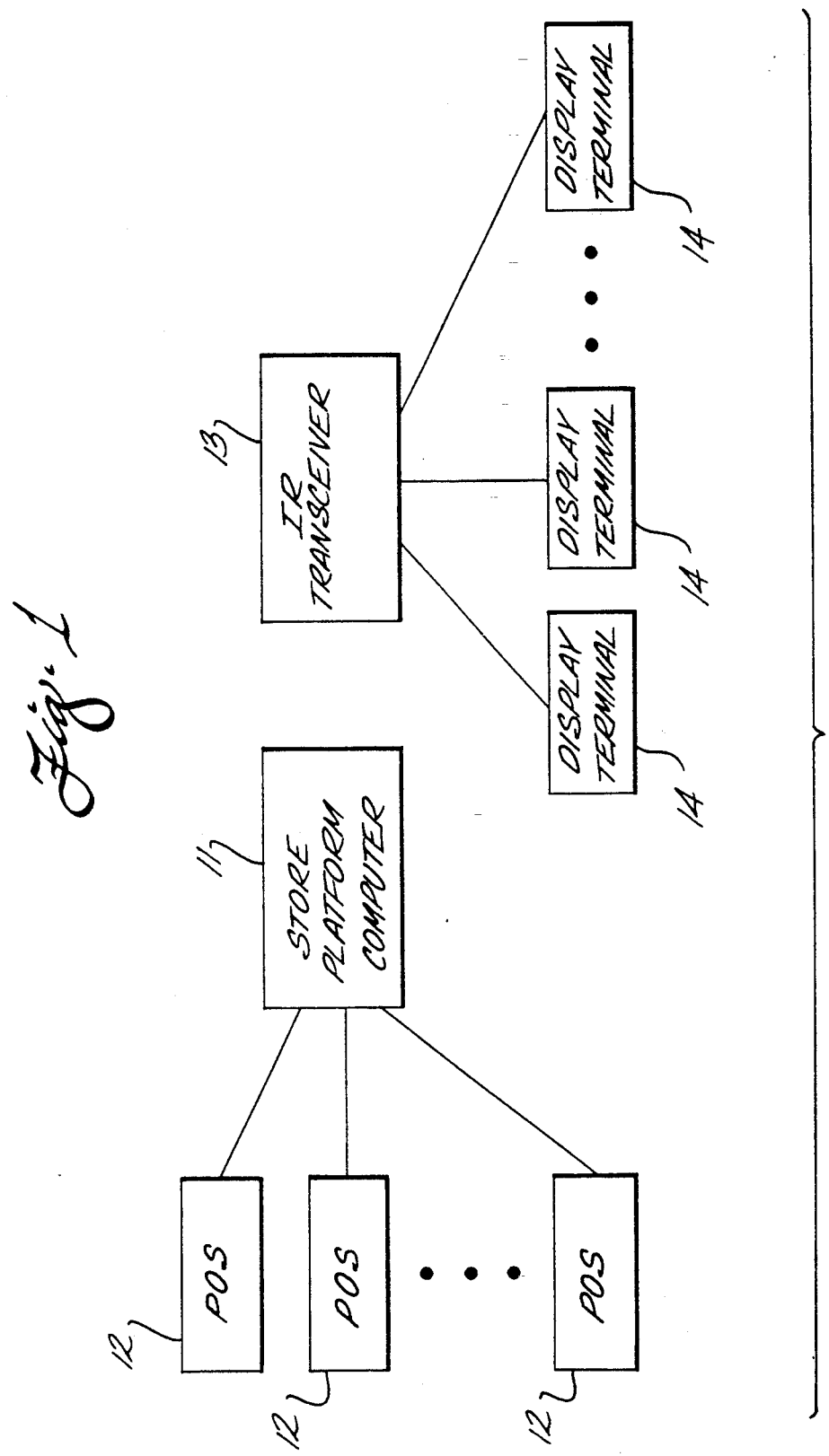
FIG. 1 is a block diagram of information display system.

Referring to FIG. 1, a general block diagram of the information display system is shown. The store platform computer 11 provides a data base for all of the merchandise in the store. The data base relates each item of merchandise with, among other things, the price of the item, and its universal product code (UPC). The store platform computer is electrically connected to a plurality of point of sale (POS) terminals 12. The POS terminals are used to sense the UPC code on the items of merchandise. The UPC is then interpreted by the POS terminal and the UPC is sent to the store platform computer. The data base in the store platform computer is referenced and the price associated with that particular UPC is found and added to the running total of the current purchase.

The store platform computer also provides information to a plurality of display terminals 14 via an optical link between each of the display terminals and an IR transceiver 13 located in or near the ceiling of the retail store. The display terminals are positioned at various point of purchase (POP) locations throughout the store. Typically, each unique type or class of merchandise will have a display terminal associated with it, the display terminal being in proximity to the merchandise. The display terminal is then used to display information related to that particular type or class of merchandise. Alternatively, display terminals may be used apart from any one item of merchandise to display information that may be of interest to shoppers in the store.

With each display terminal is associated a unique address. The display terminals will not respond to messages transmitted by the IR transceiver unless they recognize the transmission of their address along with the message. In an exemplary embodiment, the messages for all of the display terminals are transmitted in a transmission set. A transmission set is merely a series of messages, transmitted sequentially in time, each message having a unique address associated with it.

Figure 2:
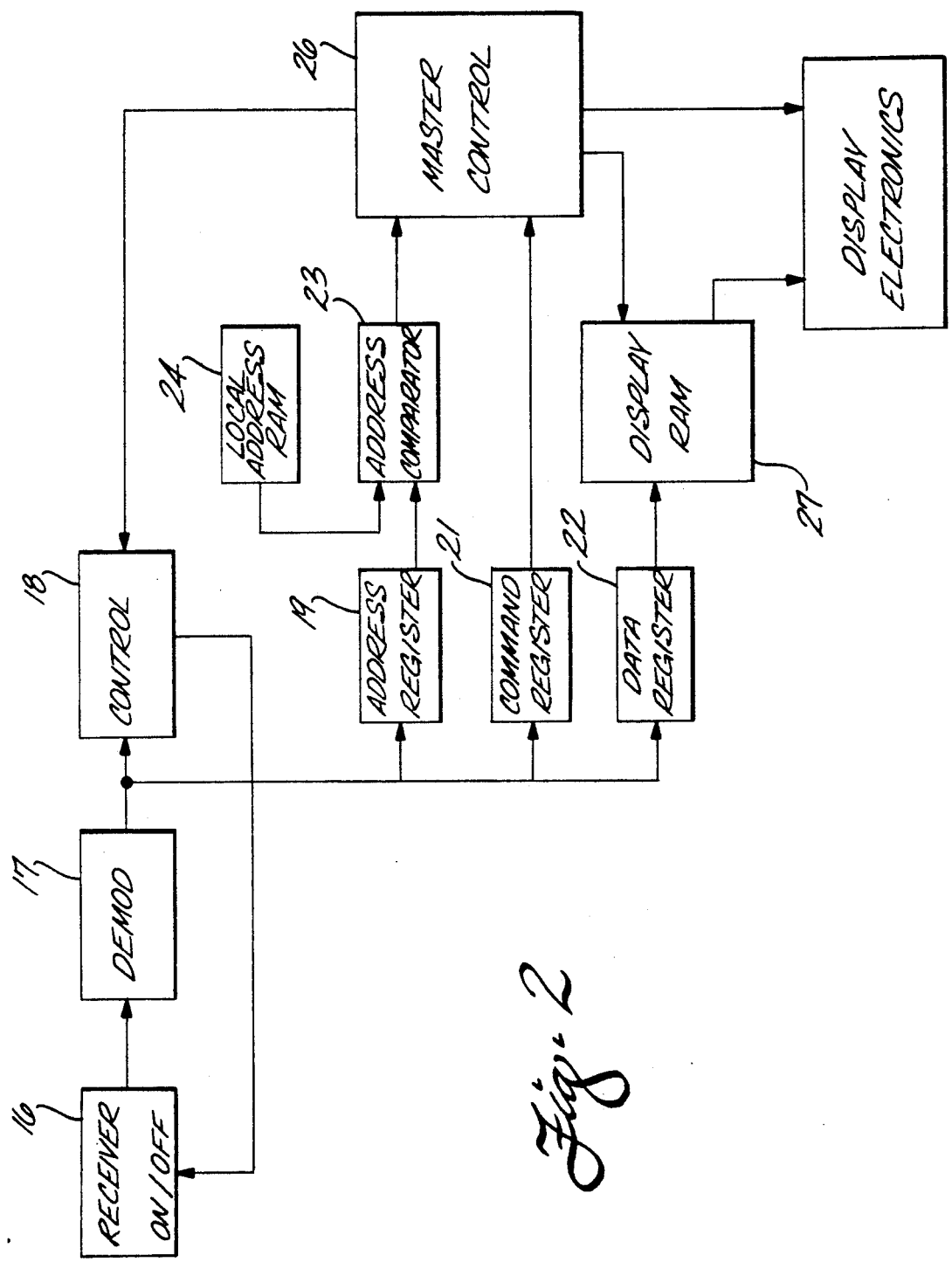
FIG. 2 is a block diagram of an exemplary display terminal.

Referring to FIG. 2, a block diagram of an exemplary display terminal is shown. The circuitry in the display terminals operates in accordance with the process illustrated in FIG. 3. Each display terminal has a receiver 16 for receiving the transmitted messages. The output of the receiver is connected to a demodulator 17 which separates the incoming message from the carrier signal transmitted by the IR transceiver. The receiver can be activated and deactivated by control circuitry 18 which is also connected to the receiver.

The output of the demodulator is connected to an address field serial-to-parallel register 19, a command field serial-to-parallel register 21 and a data field serial-to-parallel register 22. The registers 19,21 and 22 convert serial data from the demodulator into parallel data for use elsewhere in the display terminal. The output of the address field register 19 is connected to one of two sets of parallel inputs of an address comparator 23. The other set of parallel inputs to the address comparator is connected to a local address RAM 24. The unique address of the display terminal is stored in the local address RAM. The output of the address comparator as well as the output of the command field register 21 are connected to a master control 26. The output of the data field register 22 is connected to a display RAM 27. The display RAM stores the data that is transmitted to the display terminal when the transmitted address matches the local address of the display terminal. The output of the display RAM is connected to display electronics 28 in the display terminal.

Figure 3:
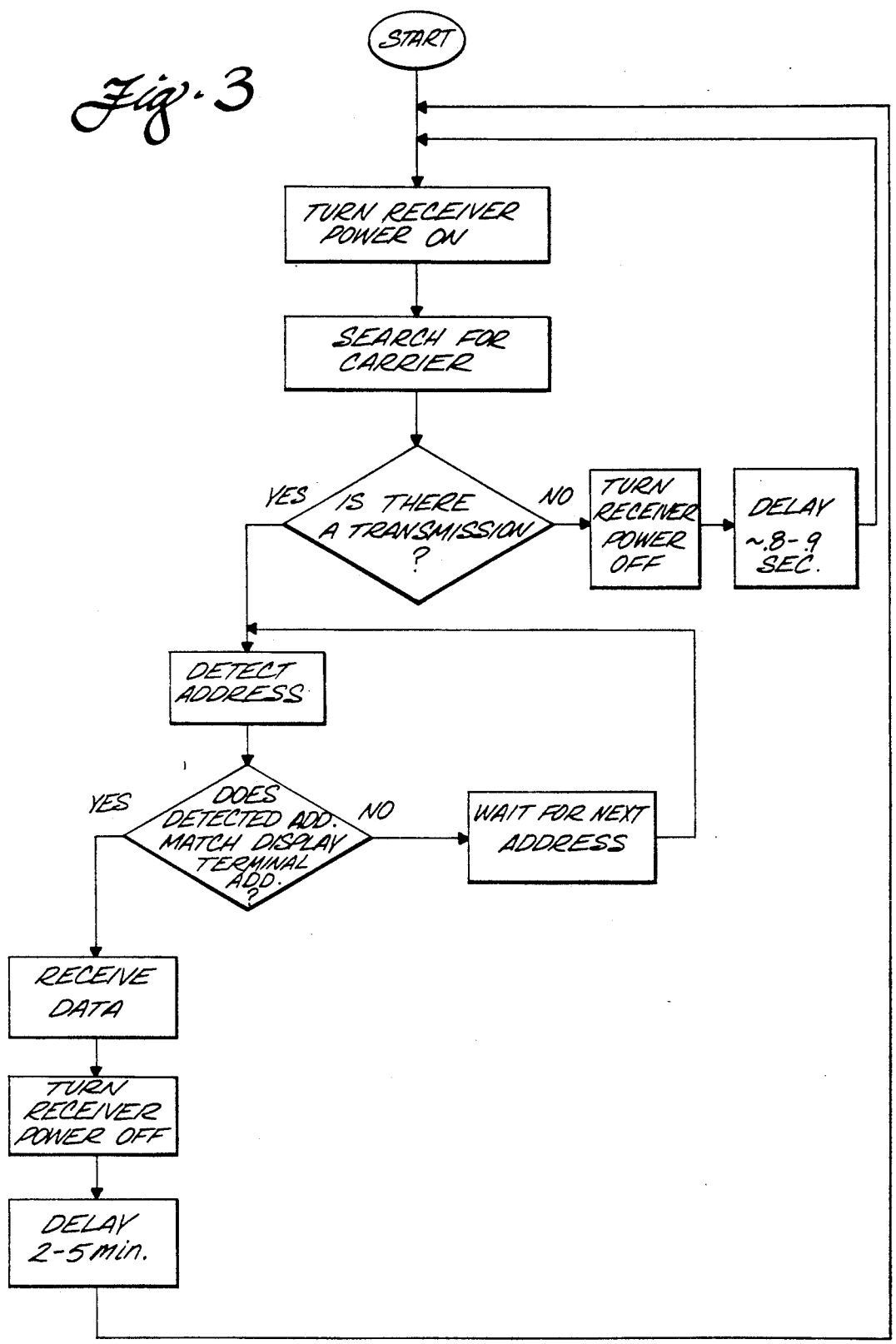
FIG. 3 is a flow diagram illustrating the operation of the display terminal.

Referring to FIG. 3, when power is first applied to the display terminal, the receiver is activated by the control circuitry in order to allow the receiver and demodulator to search for transmission of a transmission set. The display terminals can recognize the occurrence of a transmission by the presence of a carrier signal transmitted by the IR transmitter. If no transmission is detected, the control circuitry deactivates the receiver. The receiver remains off until the control circuitry repeats the process by re-activating the receiver. In an exemplary embodiment of the present invention, the receiver is activated for approximately 2 ms while it searches for a transmission, and this process is repeated once per second.

When a transmission is detected, the receiver is signaled by the control circuitry 18 to remain activated, the demodulator 17 provides data to the serial-to-parallel registers 19,21 and 22, and the address field of the received message is compared to the local address of the display terminal. If the address filed does not match the local address, the data in the command field and data field is ignored and the demodulator waits for and decodes the next transmission in the transmission set. This process is repeated until a match occurs in the address comparator, at which time, the master control allows the output of the data field register to be written into the display RAM. The master control also sends a signal to the control circuitry which indicates that data has been received by the display terminal and the control circuitry in turn deactivates the receiver. The receiver remains off long enough to ensure that the current set of transmissions has ended. In one embodiment of the present invention, the period of time that the receiver is deactivated after it has received its transmission equals the maximum time that it takes to transmit all of the messages in a transmission set. In an exemplary embodiment, it takes approximately two to five minutes to transmit to all of the display terminals. In an alternate embodiment, the control circuitry 18 keeps track of the time between first detecting the presence of a carrier and the reception of the display terminal's message. The receiver is then deactivated for a period equal to the difference between the maximum transmission time and the time that the receiver has already been activated. Once this final deactivation period has elapsed, the display terminal begins to search for the next set of transmissions by activating its receiver in one second intervals.

Figure 4:
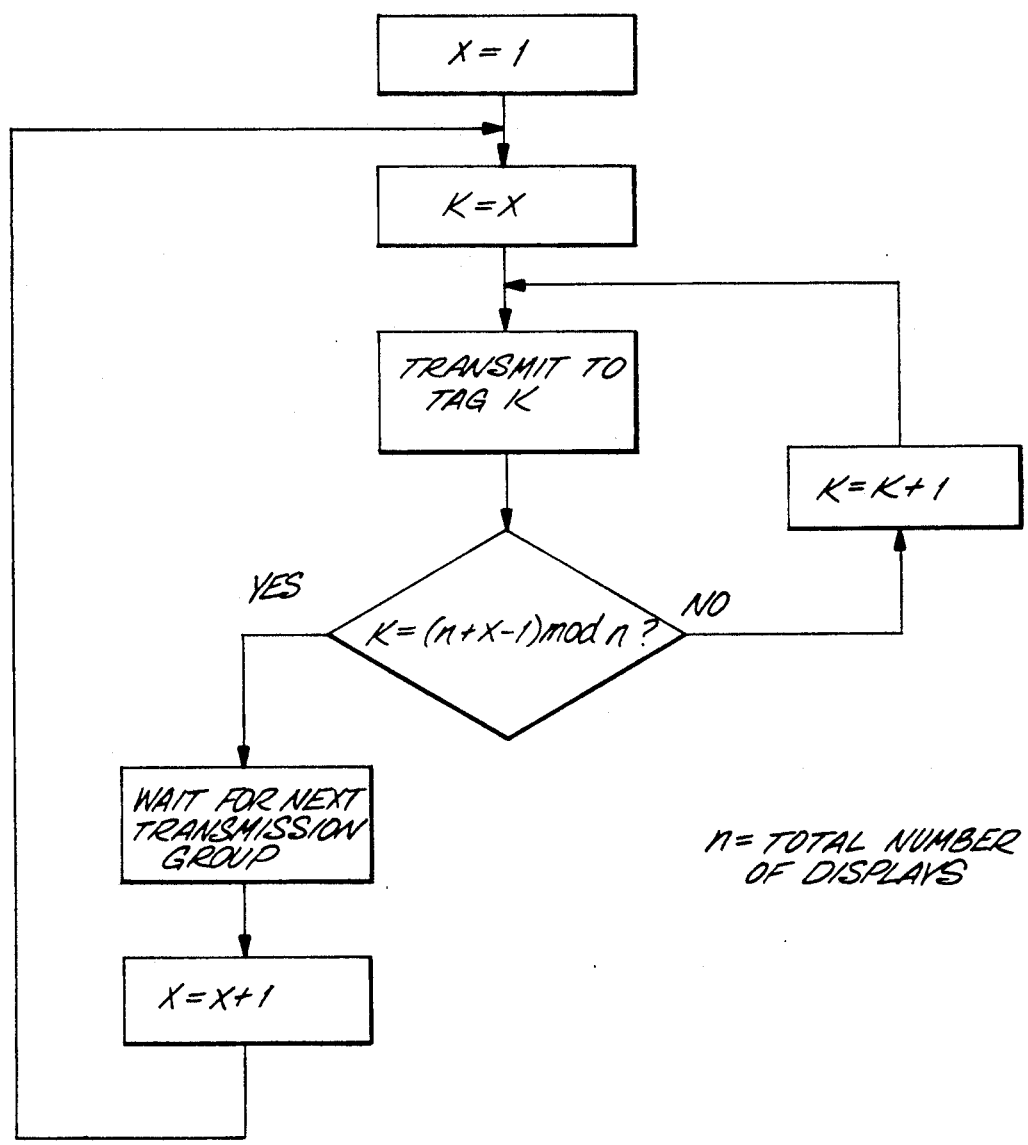
FIG. 4 is a flow diagram which illustrates how the addressing sequence of the display terminals is determined.

In an effort to distribute power consumption evenly among each of the display terminals, the order in which the display terminals are addressed in the transmission set varies in each set of transmissions. In an exemplary embodiment, the store platform computer does this in accordance with the process illustrated in FIG. 4. According to this process, the display terminal that is addressed first in the current transmission set is addressed last in the following transmission set, and all other display terminals are addressed one transmission time earlier in the following transmission set than in the current transmission set. More specifically, assuming that there are n display terminals, during the first transmission set the IR transceiver will transmit starting with display terminal "one" and will continue through to display terminal "n". During the second transmission set, the IR transceiver will begin with display terminal "two" continue through to display terminal "n" and finish with display terminal "one".

What is claimed is:

1. An electronic price display system comprising:
a plurality of spatially distributed price display terminals each having assigned to it a unique address;
a wireless transmission network comprising means for transmitting a carrier on which are modulated groups of uniquely addressed data messages of predetermined duration and individual means coupled to each respective display terminals for receiving the carrier;
means when the carrier is present for maintaining each of the individual receiving means active until receipt of the address and message unique to the corresponding display terminal;
means for deactivating each of the receiving means for the remainder of the duration of the group of messages after receipt of the address and message and;
means for varying the order in which the messages are transmitted from group to group.

* * * * *